(12) United States Patent  
Sowden et al.

(10) Patent No.: US 6,634,280 B2
(45) Date of Patent: Oct. 21, 2003

(54) COFFEE MAKING MACHINE

(75) Inventors: George Sowden, Milan (IT); Vittorio Bonissi, Milan (IT); Armando Fogagnolo, Milan (IT)

(73) Assignee: Rancilio Macchine per Caffe' S.p.A., Milan (IT)

( * ) Notice: Subject to any disclaimer, the term of this patent is extended or adjusted under 35 U.S.C. 154(b) by 28 days.

(21) Appl. No.: 10/048,885

(22) PCT Filed: May 23, 2001

(86) PCT No.: PCT/IB01/00898

§ 371 (c)(1),
(2), (4) Date: Feb. 4, 2002

(87) PCT Pub. No.: WO01/91620

PCT Pub. Date: Dec. 6, 2001

(65) Prior Publication Data

US 2002/0104441 A1 Aug. 8, 2002

(30) Foreign Application Priority Data

May 31, 2000 (IT) .................................. TO2000A0503

(51) Int. Cl.⁷ .................................................. A47J 31/40
(52) U.S. Cl. ................. 99/302 P; 99/302 R; 99/289 R
(58) Field of Search ........................ 99/302 P, 302 R, 99/289 R, 279, 287, 295

(56) References Cited

U.S. PATENT DOCUMENTS

| 4,852,472 A | | 8/1989 | In-Albon et al. ......... 99/289 R |
| 5,275,089 A | * | 1/1994 | Armellin .................. 99/289 R |
| 6,253,664 B1 | * | 7/2001 | Giannelli .................. 99/302 P |
| 6,431,055 B2 | * | 8/2002 | Bonanno | |

FOREIGN PATENT DOCUMENTS

| BE | 745 939 A | 7/1970 |
| EP | 0 659 377 A | 6/1995 |

* cited by examiner

Primary Examiner—Reginald L. Alexander
(74) Attorney, Agent, or Firm—Paul & Paul

(57) ABSTRACT

An infusion group for infusion making machines, in particular for making espresso coffee, comprises a moving member (2) that has an internal cavity (3) adapted to receive a dose of powdered substance and that can be horizontally translated. The chamber co-operates with a piston (4) that can be horizontally translated and with a stationary piston (5), and the dose of powdered substance can be compressed between such pistons because of the translation. The moving member (2) and the moving piston (4) are simultaneously translated in opposite directions by respective threaded shafts (8, 18) that are simultaneously rotated in opposite directions.

12 Claims, 7 Drawing Sheets

COFFEE MAKING MACHINE

The present invention relates to automatic machines for infusion making, in particular for making espresso coffee, and more particularly it concerns an infusion group for one such machine.

Some kinds of infusion making machines include an infusion group comprising a chamber intended to receive the powdered substance, and a pair of confronting pistons which penetrate into the chamber and between which the powder is compressed. Suitable ducts supply hot water for preparing the infusion so that water passes through the powder, and collect and convey outside the machine the infusion. The main problems encountered in such machines are the compression control and the disposal of the used substance at the end of the operations, so as to leave the infusion group clean and ready for making a new infusion dose.

An example of infusion group of that type is disclosed in U.S. Pat. No. 4,852,472. In that infusion group the chamber intended to receive the ground coffee is formed by the internal cavity of an axially sliding cylinder. The cylinder is associated with a first moving piston mounted so as to move together with the cylinder when the latter is translated to compress the coffee, and to remain in that position, to eject the used coffee dose, during part of the return stroke of the cylinder. The second piston can slide for a short length against the action of a spring because of the compression exerted by the first piston. Filter cleaning is ensured by a water jet introduced in similar manner to the infusion water.

That infusion group is simple, since the motion of a single part is to be controlled, and allows an easy disposal of the used coffee and an easy filter cleaning; yet the control of the powder compression degree, and hence of the infusion quality, is difficult because of the relative movement of the two pistons.

Another infusion group including a chamber movable relative to a pair of confronting pistons is disclosed in BE-A 745 939. In the infusion group disclosed in that document, the infusion chamber is formed in a cylinder with horizontal axis, which is made to slide horizontally relative to a first stationary piston by a pair of threaded shafts rotating in the same direction. The first piston is housed within the cylinder cavity and divides it, when the infusion is being prepared, into two chambers containing the coffee and additional ingredients, such as milk and/or sugar, respectively. The second piston is a moving piston and it is horizontally displaced, when the cylinder has reached an end-of-stroke position, by the same shaft pair as that driving the cylinder, which shafts continue rotating in the same direction. The displacement of the second piston brings it inside the cylinder cavity to compress the ground coffee against the first piston. Infusion water is fed through the first piston and, after passing through the coffee, enters into the chamber containing the additional ingredients, where the coffee infusion is mixed with said ingredients by means of a mixer. Ejection of the used coffee can take place by gravity or can be caused by a blade used to clean the filters.

Coffee compression between a piston driven by own driving means and a fixed piston allows a good control of the compression degree. Yet the prior art device has a great structural complexity, due to the driving of the cylinder and the moving piston in subsequent steps, by means of the same shaft pair, and to the need of a suitable device for cleaning the filters.

The invention aims to provide an infusion group in which a good control of the powder compression is ensured by means of a very simple structure.

The infusion group according to the invention comprises a moving member with an internal cavity open at both ends and adapted to receive a dose of powdered substance supplied through introduction means, and means for causing an axial translation of said member relative to a pair of confronting pistons, of which one is a moving piston connected to said translation means so as to be axially displaced, and the other is a stationary piston, said pistons being adapted to co-operate with said cavity by tightly engaging the cavity walls in order to define an infusion chamber, and having heads equipped with filters between which said dose of powdered substance can be compressed because of the translation movements of said member and said moving piston. The groups is characterised in that said translation means comprise a first and a second threaded shaft that are associated with said moving member and said moving piston, respectively, and are simultaneously rotated in opposite directions by a driving member so as to cause simultaneous axial translation, in opposite directions, of the moving member and the moving piston.

For a better understanding, reference is made to the accompanying drawings, which show preferred embodiments of the invention and in which.

Figure 1:
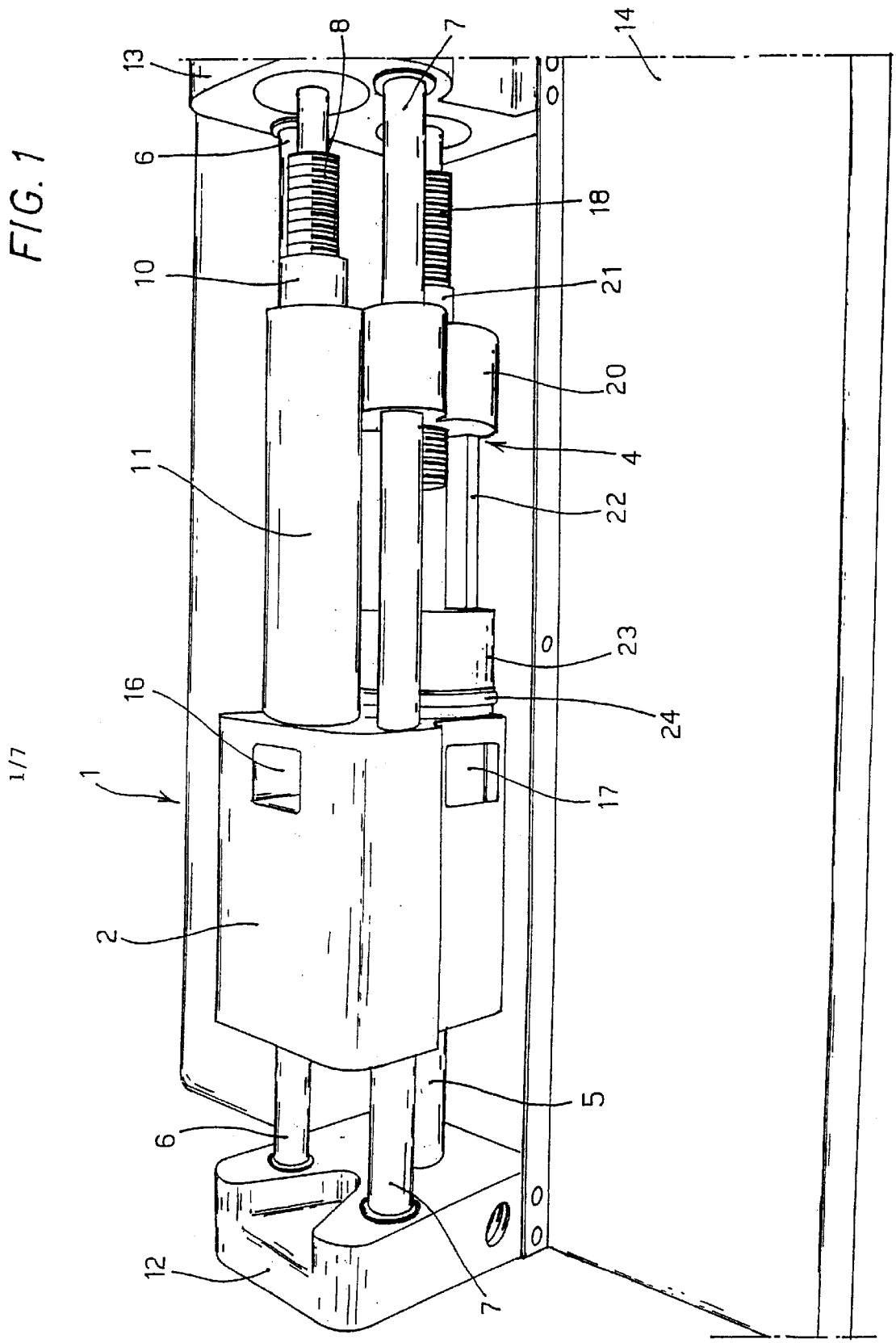
FIG. 1 is a perspective view of the infusion group according to the invention.

Referring to the drawings, the infusion group according to the invention, denoted in the whole by reference numeral 1, comprises a horizontally moving member or chamber 2, having an internal cavity 3 (that can be seen in FIGS. 2 to 4) intended to receive the dose of ground coffee or other powdered substance. A first piston 4, also horizontally moving, and a second stationary piston 5 co-operate with the cavity to define the actual infusion chamber.

Figure 2:
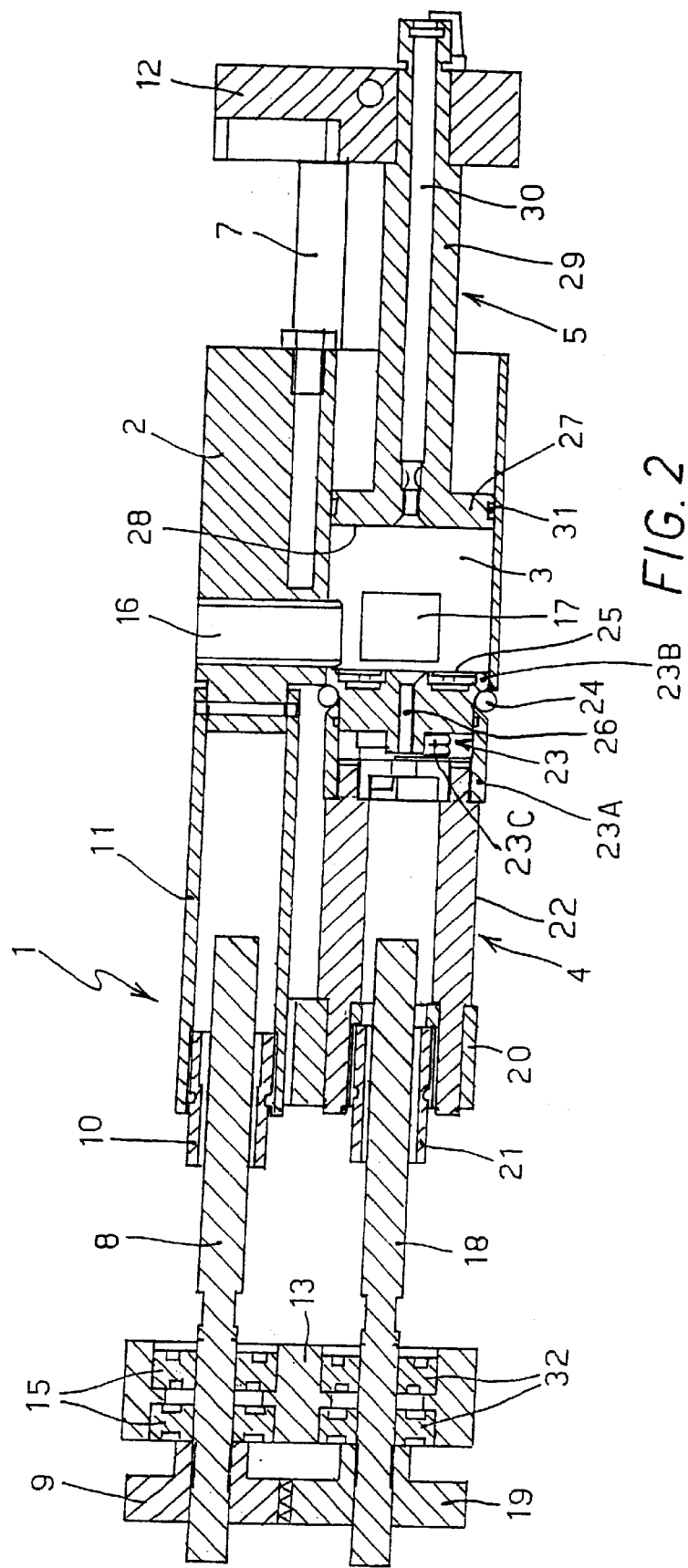
FIGS. 2 to 4 are three rear views, in axial vertical cross section, of a first embodiment of the infusion group, in three different operation phases.
Figure 3:
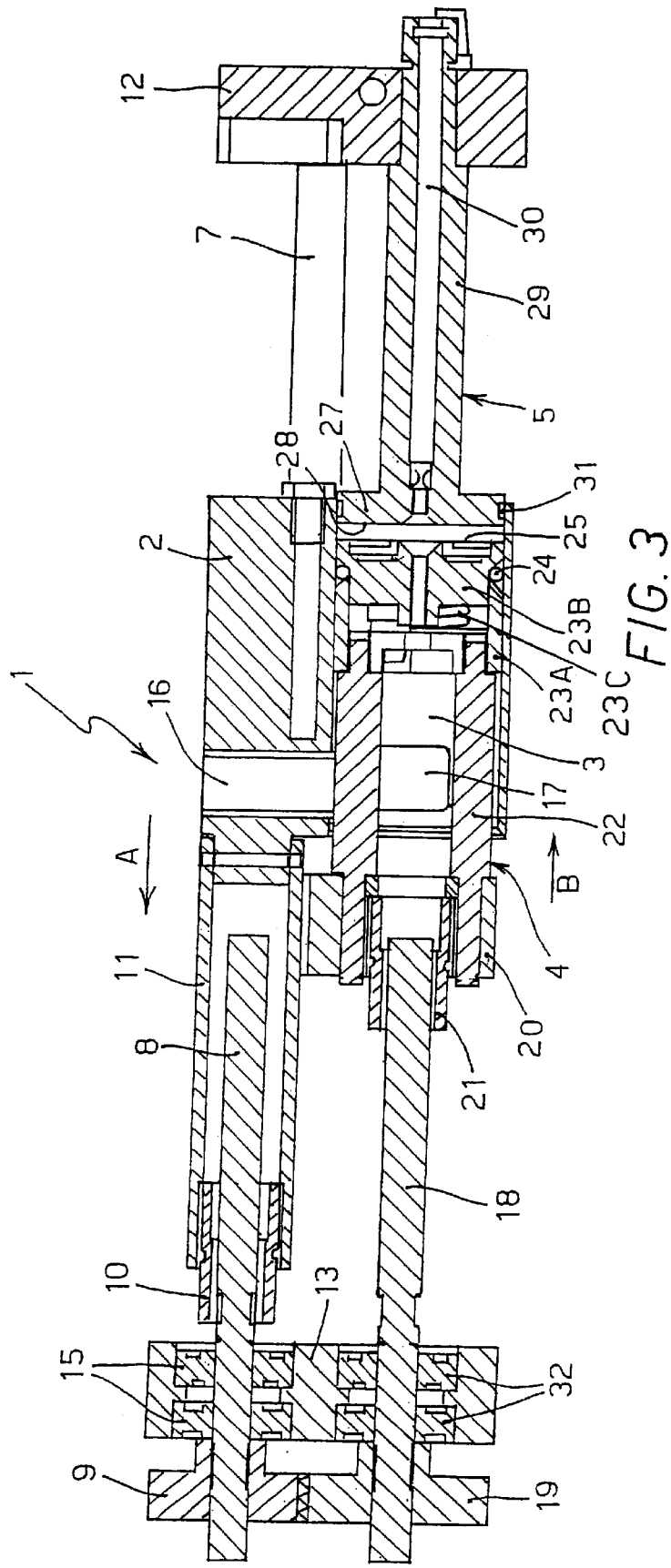
Figure 4:
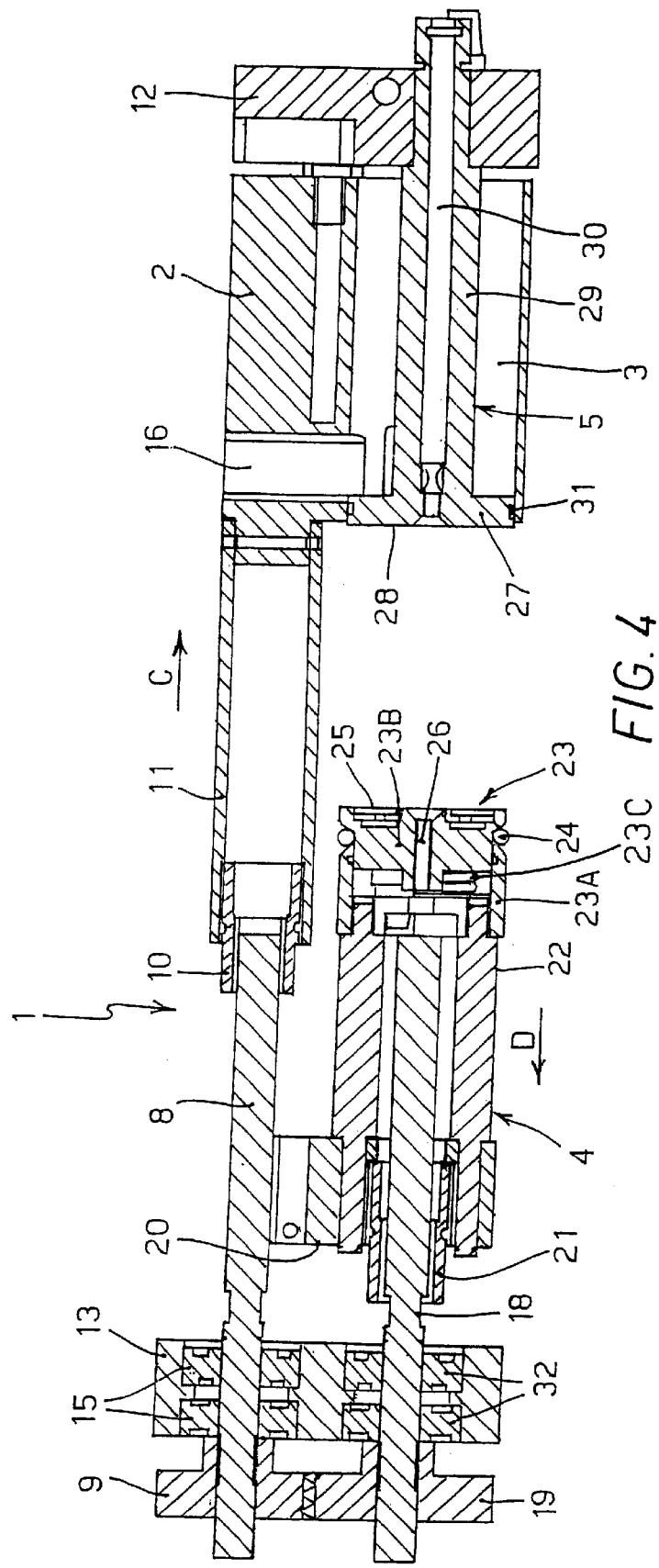

Moving chamber 2 is made to slide on guides 6, 7 by a threaded shaft 8 driven by a motor, not shown, through a reduction gear of which FIGS. 2 to 4 show the end gear 9, integral with shaft 8. The latter meshes with an internally threaded sleeve 10, integral with a hollow shaft 11 in turn secured to the body of moving chamber 2. Guides 6, 7 are secured in supports 12, 13 carried by a frame 14, and shaft 8 is in turn mounted in bearings 15 (FIGS. 2 to 4) located in support 13.

Moving chamber 2 has an upper duct 16 for introducing into infusion chamber 3 ground decaffeinated coffee, coming from a reservoir, not shown, and a pair of confronting side openings or ducts 17 (only one of which can be seen in the drawings) for introducing ground normal coffee, coming from lateral coffee grinders, also not shown.

Also moving piston 4 is slidable on guides 6, 7, and it is driven by a shaft 18 bearing at one end a gear 19, meshing with gear 9 of shaft 8 driving moving chamber 2 so that the two shafts are simultaneously rotated in opposite directions in order to simultaneously translate moving chamber 2 and moving piston 4 in opposite directions. Also shaft 18 is carried by support 13, through bearings 32 similar to bearings 15.

Moving piston 4 has a body 20 with lobed shape, of which the central portion is associated with a threaded sleeve 21 meshing with shaft 18, whereas a pair of side lobes has openings through which guides 6, 7 pass. Body 20 is connected, through spokes 22, with piston head 23, which can tightly fit into infusion chamber 3. Tightness is ensured by an O-ring 24.

As shown in FIGS. 2 to 4, head 23 is equipped at its free end with a disc-shaped filter 25 for the coffee and has an axial duct 26 for introducing hot water, supplied through tubes, not shown, passing e.g. through support 12. Head 23 comprises two telescopically connected members 23A, 23B, of which member 23A is secured to spokes 22 and can slide on member 23B, which bears at its end filter 25. The region of filter 25 has a greater diameter than the remaining part of member 23B and forms a flange defining, together with the free end of member 23A, a seat for O-ring 24. Said free end is so shaped as to cause a radial expansion of O-ring 24 when engaging it. An arrangement of this kind, which is known in se from FR-A 2 202 668, allows keeping O-ring 24 in a non-expanded condition until it enters into cavity 3, thereby preventing the O-ring wear caused by the rubbing against the mouth of cavity 3. A spring 23C tends to keep members 23A, 23B in a rest condition, in which O-ring 24 is not stressed.

Stationary piston 5, mounted in support 12, has in turn a head 27 equipped at its free end with a disc-shaped filter 28 for the coffee, and a rod 29 with an axial duct 30 extending along its whole length and intended to convey the infusion outside infusion group 1, once the infusion is ready.

In this first embodiment, head 27 consists of an integral body and tightly fits in cavity 3. Tightness is ensured by an O-ring 31. It is to be appreciated that the longitudinal size of cavity 3 and the lengths of the strokes of shafts 8, 18 are such that O-ring 31 always remains inside cavity 3. Moreover, the stroke lengths could be adjusted to adjust the compression degree of the powder.

Figure 5:
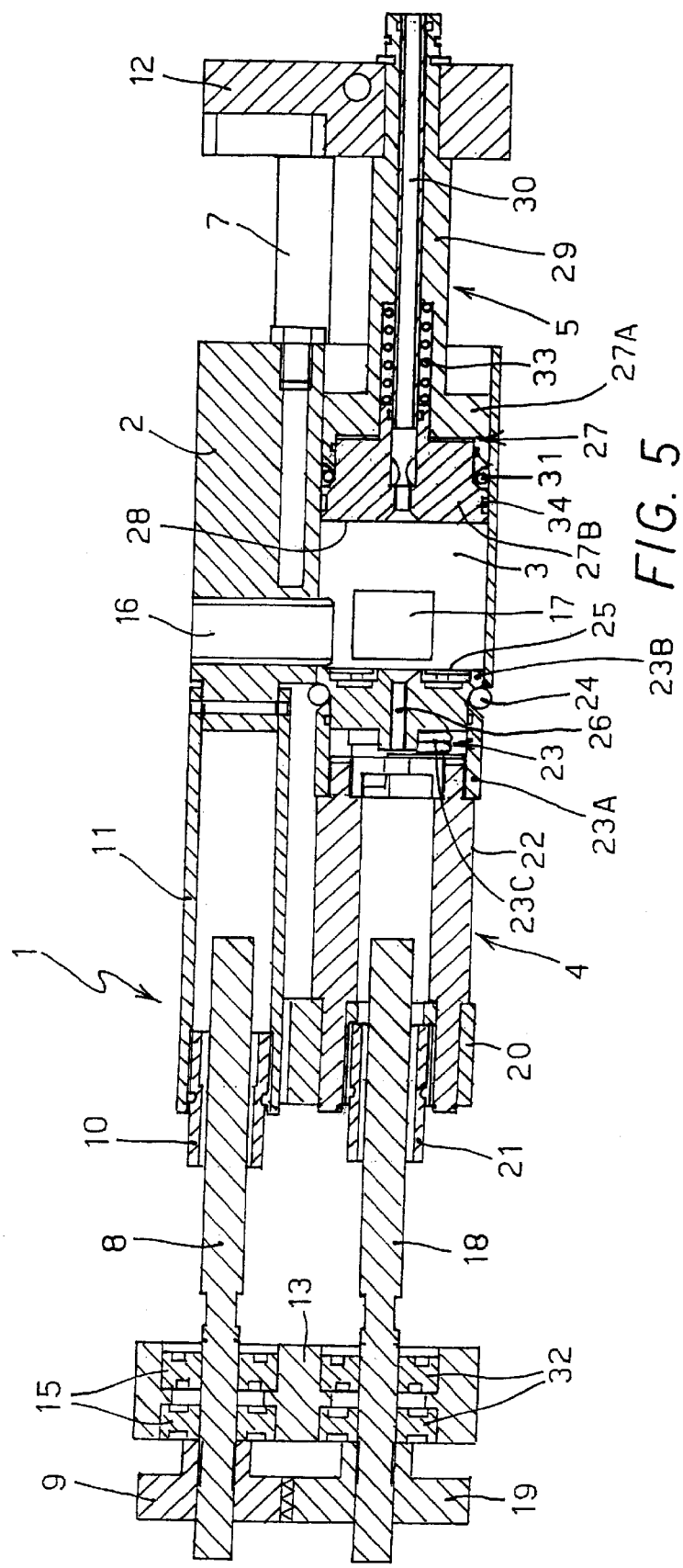
FIGS. 5 to 7 are views similar to FIGS. 2 to 4, relating to a second embodiment of the infusion group.
Figure 6:
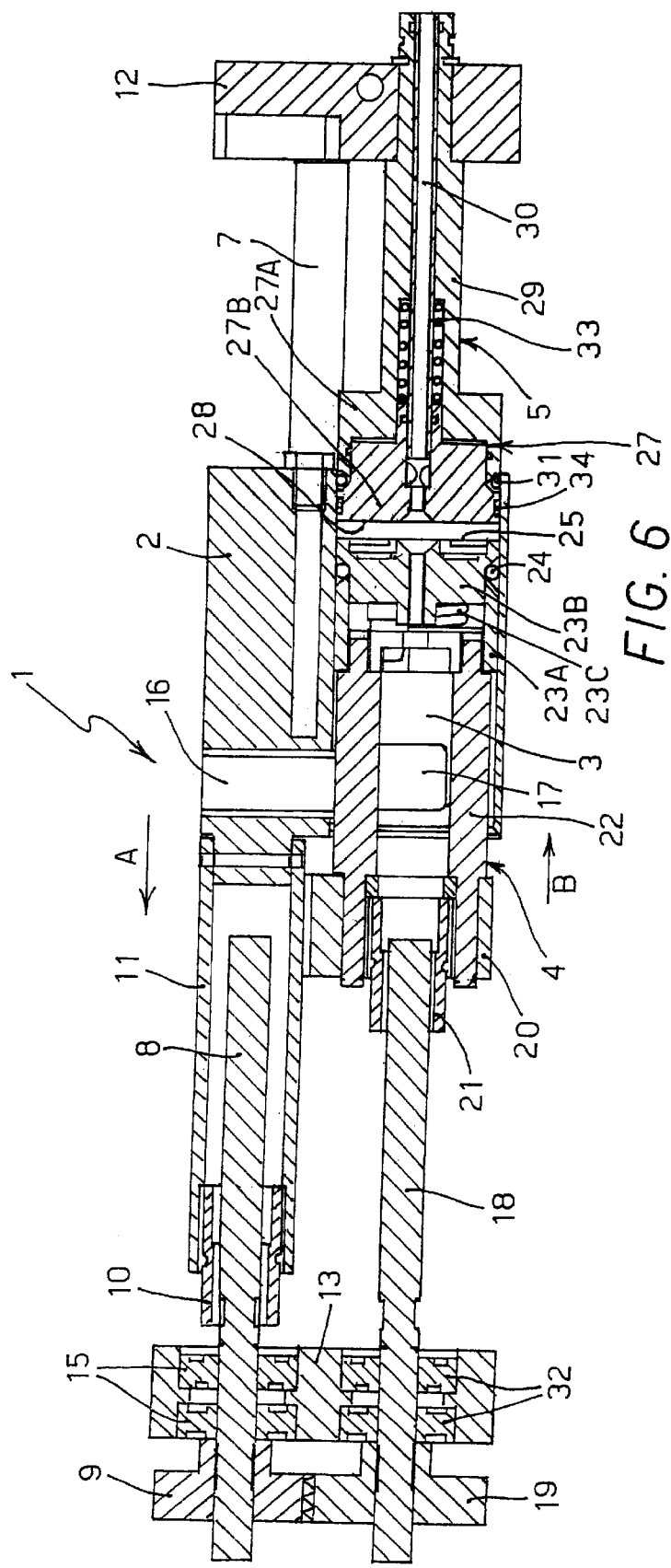
Figure 7:
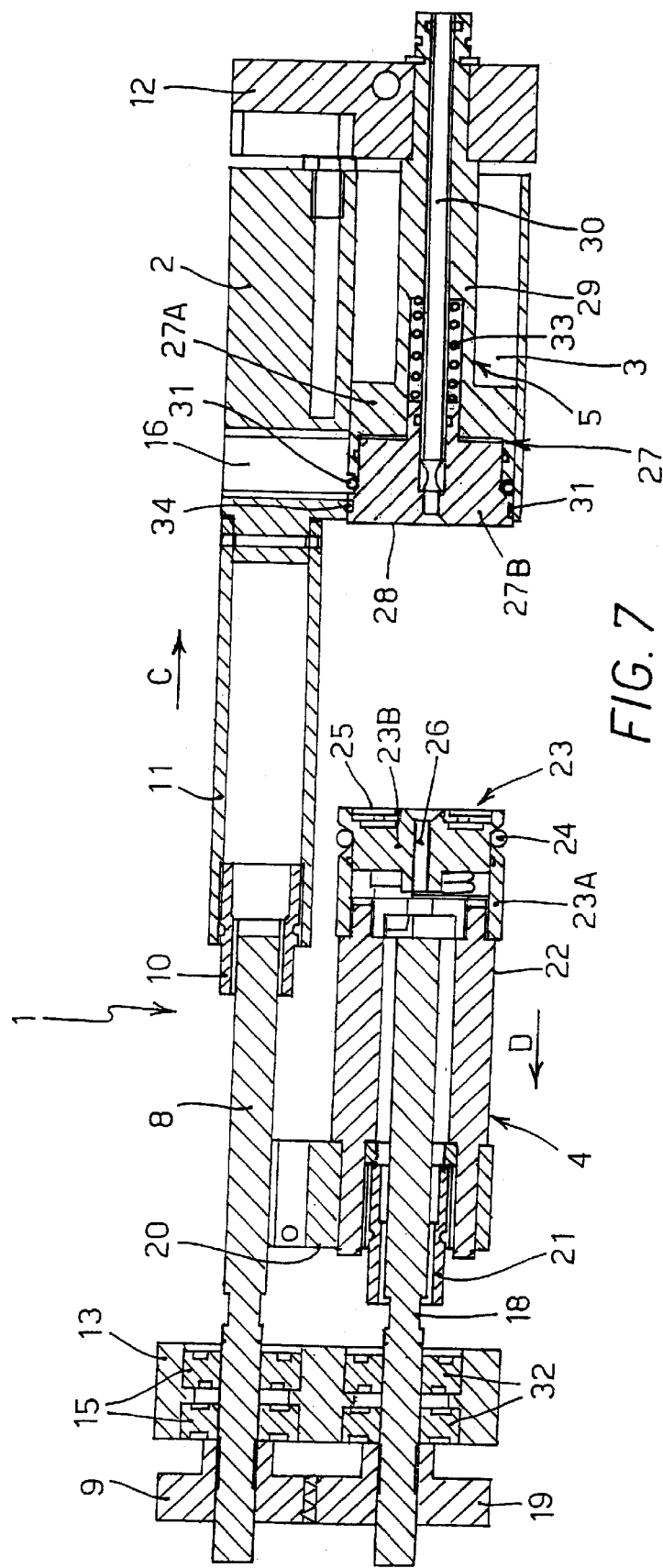

In the embodiment shown in FIGS. 5 to 7, head 27 of stationary piston 5 comprises, like head 23 of moving piston 4, two telescopically connected members 27A, 27B in order to reduce the wear of O-ring 31. Member 27A is integral with stem 29. Member 27B is slidably mounted in member 27A against the action of a spring 33 arranged in a seat formed in stem 29, around duct 30. Like member 23B of head 23 of stationary piston 4, member 27B has a portion of enlarged diameter bearing filter 28 and forming a flange defining, together with the free end of member 27A, a seat for O-ring 31. Such free end is so shaped as to cause, when engaging O-ring 31, a radial expansion thereof to make it adhere to the walls of cavity 3 when tightness is actually required. Moreover, a second gasket 34 is provided in said flange portion, said gasket consisting of a ring with rectangular cross-section and being intended to remove from the walls of cavity 2, during a step of used coffee ejection, possible residuals adhering to the same walls.

In that embodiment, the longitudinal size of cavity 3 and the lengths of the strokes of shafts 8, 18 are such that gasket 34 always remains inside cavity 3 and lies in correspondence with the mouth of cavity 3 at the end of the stroke of chamber 2.

The operation of the infusion group will now be disclosed with reference to FIGS. 2 to 4 and 5 to 7, which show the positions of the different members of the infusion group in the phases of ground coffee loading (FIGS. 2 and 5), maximum compression and infusion (FIGS. 3 and 6) and used coffee ejection (FIGS. 4 and 7). By way of example, it will be assumed that the positions of the different members in the loading phase coincide with the positions taken by the same members in rest conditions of the machine: thus, when the machine is actuated, openings 16 and 17 already lie in correspondence with the outlets of the feeders of ground coffee and an initial displacement of moving chamber 2 and moving piston 4 is not required. However, it is clear that the rest position could be different, for instance it could coincide with the ejection position.

Considering first the embodiment of FIGS. 2 to 4, FIG. 2 shows that, in the loading phase, moving chamber 2 and moving piston 4 are at intermediate points of their strokes. In particular, moving chamber 2 is in such a position that head 27 of stationary piston 5 lies inside cavity 3, at a point between the outlet of ducts 16, 17 and the mouth of cavity 3 facing support 12, whereas head 23 of moving piston 4 is partly introduced into cavity 3, with O-ring 24 adjacent to the mouth of cavity 3 but still outside cavity 3. In such conditions cavity 3 forms a closed infusion chamber and the coffee dose can be introduced through duct 16 or ducts 17.

Once the desired coffee dose has been introduced, shafts 8, 18 are rotated so as to cause the displacement of moving chamber in the direction of arrow A in FIG. 3, and the simultaneous displacement of moving piston 4, and hence the sliding of head 23 within cavity 3, in the direction of arrow B of FIG. 3. During such phase, ring 24 is not expanded and hence it contacts neither the mouth of cavity 3 when being introduced into the cavity, nor the walls thereof during the subsequent displacement.

At the same time, due to the displacement of moving chamber 2, the distance between head 27 of the stationary piston and the mouth of cavity 3 facing support 12 will progressively decrease. At the end of the displacement of moving chamber 2 and moving piston 4, the compression group 1 has taken the position shown in FIG. 3. Head 23 of the moving piston is at the minimum distance from head 27 of stationary piston 5, and hence the maximum compression of the powder has been attained.

Approaching of head 23 to the maximum compression position causes a sliding of member 23A onto member 23B and compression of spring 23C. Consequently, member 23A presses on the end flange of member 23B thereby causing expansion of O-ring 24. Radial expansion of the latter ensures tightness with the internal walls of cavity 3. The maximum expansion of the ring will be attained upon attaining the maximum compression position.

Head 27 of the stationary piston in turn has reached the mouth of infusion chamber 3 facing support 12. Under such conditions, rotation of shafts 8, 18 is stopped and hot water is introduced into duct 26. Water passes through filter 25 and the compressed coffee, and the infusion then flows out through filter 28 and duct 30.

At the end of the desired percolation time (set in any suitable manner), shafts 8, 18 are again actuated, but in reverse directions with respect to the compression phase: thus moving chamber 2 and moving piston 4 are displaced in the direction of arrows C, D of FIG. 4, respectively. During such displacement, as soon as the distance between the two filters is sufficiently high, spring 23C brings again the two members of head 23 to the rest position, where O-ring 24 is not in contact with the walls of cavity 3. When shafts 8, 18 reach the end of such displacement, the infusion group is in the condition of used coffee ejection, shown in FIG. 4. Moving piston 4 is adjacent to support 13 and is completely outside cavity 3, whereas moving chamber 2 is adjacent to support 12. Head 27 of stationary piston 5 is located in correspondence of the end of cavity 3 remote from support 12, with filter 28 outside cavity 3, so that the used coffee can fall by gravity in the gap between confronting heads 23, 27. Moving chamber 2 and moving piston 4 can then be brought again to the position shown in FIG. 2 and the machine is ready for a new cycle.

In the embodiment of FIGS. 5 to 7, the operation of moving piston 4 is of course unchanged. In the loading phase (FIG. 5), spring 33 keeps member 27B separated form member 27A, so that O-ring 31 is not expanded and does not contact the walls of cavity 3. Subsequently, during displacement of moving chamber 2 and moving piston 4, at a given instant the thrust exerted by piston 4 will become sufficient to overcome the resistance of spring 33, and member 27B of the stationary piston head will start sliding within stationary member 27A. Consequently, O-ring 31 begins radially expanding. Once the maximum compression position has been attained (FIG. 6), also O-ring 31 ensures the perfect tightness with the internal walls of cavity 3. The machine is thus ready for infusion water introduction. During the ejection phase, members 27A, 27B of the stationary piston head resume their rest position when member 27B is no longer stressed by member 23B of the moving piston head. Moreover, during displacement of moving chamber 3 in the direction of arrow C, gasket 34 will remove coffee residuals, if any, adhering to the chamber walls. At the end of the displacement (FIG. 7), filter 28 will lie, as before, outside the cavity, so that the used coffee can fall by gravity in the gap between confronting heads 23, 27. Seal 34 will instead lie in correspondence of the cavity mouth, so that also the coffee residuals, if any, removed from the cavity walls can be brought outside the chamber.

The previous description clearly shows that the invention allows a good compression control, thanks to the co-operation between a piston that is positively driven (and not only dragged) and a substantially stationary piston, inside a very simple structure, resulting from the simultaneous actuation of the moving chamber and the moving piston. Moreover, the invention ensures a good cleanliness of the group.

It is to be appreciated that, for sake of simplicity, the control means for starting and stopping the motor driving the shafts, dosing and introducing the powdered substance into the infusion chamber, heating water etc. have not been shown. On the other hand, said means are not affected by the present invention and are well known to the skilled in the art.

It is evident that the above description is given only by way of non limiting example and that all changes and modifications suggested by the experience of the skilled in the art lie within the scope of the invention

What is claimed is:

1. An infusion group for a machine for preparing infusions from a compressed powdered substance, the group comprising a moving member (2) having a longitudinal internal cavity (3) open at its ends and adapted to receive a dose of said powdered substance fed through means (16, 17) for introducing the powdered substance, and means (8, 9, 18, 19) for causing an axial translation of said member (2) relative to a pair of confronting pistons (4, 5 ), one of which is a moving piston (4) connected to said translation means (8, 9, 18, 19) so as to be axially translated, and the other one is a stationary piston (5), said pistons (4, 5) being adapted to co-operate with said cavity (3) by tightly engaging the cavity walls in order to define an infusion chamber and having heads (23, 27) equipped with filters (25, 28) between which said dose of powdered substance can be compressed because of the translation movements of said moving member (2) and said moving piston (4), characterised in that said translation means (8, 9, 18, 19) comprise a first and a second threaded shaft (8, 9) that are associated with said moving member (2) and said moving piston (4), respectively, and are simultaneously rotated in opposite directions by a driving member so as to cause simultaneous axial translation, in opposite directions, of the moving member (2) and the moving piston (4).

2. An infusion group as claimed in claim 1, characterised. in that said translation means (8, 9, 18, 19) are adapted to make said moving member (2) and said moving piston (4) perform, during an operation cycle, at least:

a first simultaneous translation from a loading position of the powdered substance, where the head (23) of the moving piston (4) lies in correspondence of a first mouth of said cavity (3) and the head (27) of the stationary piston (5) lies inside said cavity (3), at such an intermediate point between the first mouth and a second mouth that said means (16, 17) for introducing the powdered substance introduce the powdered substance in the gap between the heads of the pistons, to a maximum compression position, where the head of the stationary piston (5) lies substantially in correspondence of said second mouth and the head of the moving piston (4) lies inside said chamber (3), at a point located at a minimum predetermined distance from the head of said stationary piston (5); and a second simultaneous translation from said maximum compression position and a ejection position of the compressed and used dose of the substance, where the filter (28) associated with the head (27) of the stationary piston (5) projects out of said first (29) mouth and the moving piston (4) is located wholly outside said cavity (3), at such a distance that a sufficient gap exists between its head (23) and the head (27) of the stationary piston (5) to let the compressed and used dose of the substance fall down, said second simultaneous translation of the moving member (2) and the moving piston (4) place in respectively opposite directions to the first translation.

3. An infusion group as claimed in claim 1 or 2, characterised in that said means (16, 17) for introducing the powdered substance are adapted to allow alternatively introducing a first or a second substance.

4. An infusion group as claimed in claim 3, characterised in that said means (16, 17) for introducing the powdered substance comprise a first duct (16), perpendicular to a longitudinal axis of said cavity (3), for introducing a dose of the first powdered substance, and a pair of second ducts (17), perpendicular to said axis and said first duct (16), for introducing a dose of the second powdered substance.

5. An infusion group as claimed in claim 3, characterised in that said first powdered substance is decaffeinated coffee, and said second powdered substance is normal coffee.

6. An infusion group as claimed in claim 1, characterised in that said moving piston (4) has a body (20) adapted to engage the second threaded shaft (18) and connected to said head (23) through a plurality of spokes (22), and in that said body (20) has a lobed shape with a pair of lobes adapted to slide over respective parallel guides (6, 7) which are slidably engaged also by said moving member (2).

7. An infusion group as claimed in any one of claims 2 and 6, characterised in that the head (23) of said moving piston (4) comprises two telescopically connected members (23A, 2313) having external surfaces shaped so as to define a seat for a sealing gasket (24), the telescopic connection of said two members (23A, 23B) and the shaping of said external surfaces being such that, during said first translation, an end portion of a first one of said two members (23A, 23B) stresses said gasket (24) and causes a radial expansion thereof when the gasket lies inside the cavity (3), near or at the point of minimum distance between the heads (23, 27) of the two pistons (4, 5).

8. An infusion group as claimed in any one of claims 1 and 2, characterised in that said stationary piston (5) has an axial duct (30) extending over the whole length of a piston stem (29), for sending the prepared infusion outside the infusion group.

9. An infusion group as claimed in claim 2, characterised in that the head of said stationary piston (5) comprises two telescopically connected members (27A, 27B) having external surfaces so shaped as to define a seat for a sealing gasket (31), the telescopic connection of said two members and the shaping of said external surfaces being such that, during said first translation and because of a thrust exerted by the head (23) of said moving piston (4) on a first one (2713) of said two members (27A, 2713), an end portion of the second one (27A) of said two members (27A 2713) stresses said gasket (31) and causes a radial expansion thereof bringing it into tight engagement with the walls of said cavity (3) near or at the point of minimum distance between the heads (23, 27) of the two pistons (4, 5).

10. An infusion group as claimed in any one of claims 2 and 9, characterised in that said first member (2713) of the head (27) of said stationary piston (5) comprises a further gasket (34) for removing, during said second translation, residuals of said used powdered substance adhering to said walls.

11. An infusion group as claimed in claim 10, characterised in that said further gasket (34) is arranged on said member (27B) in such a position that, in said ejection position, it lies within the cavity (3), substantially in correspondence of said first mouth.

12. An infusion group as claimed in claim 10, characterised in that said further gasket (34) has a substantially rectangular cross section.

* * * * *